Figure 7:
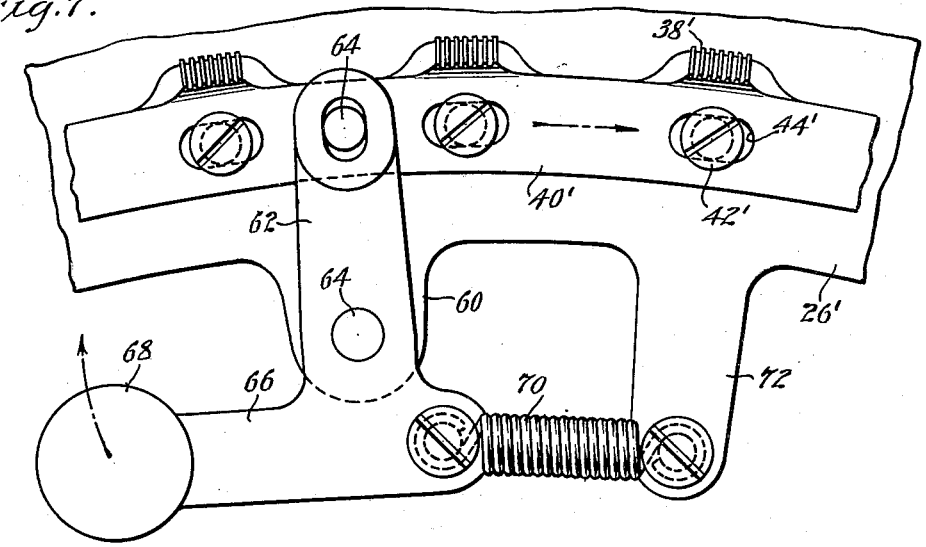

Aug. 19, 1952           G. A. DEAN           2,607,430
FAN FOR AIRCRAFT PROPELLER SPINNERS
Filed Feb. 26, 1946           4 Sheets-Sheet 1
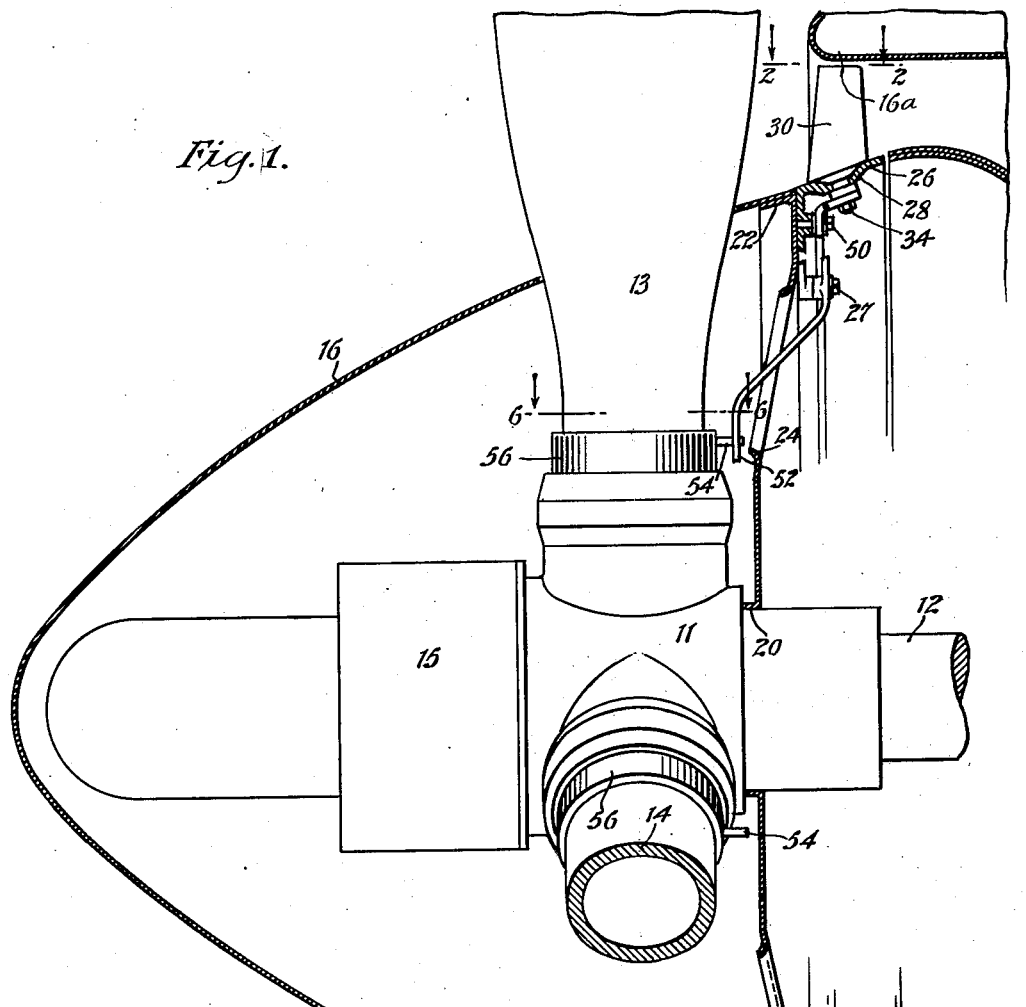
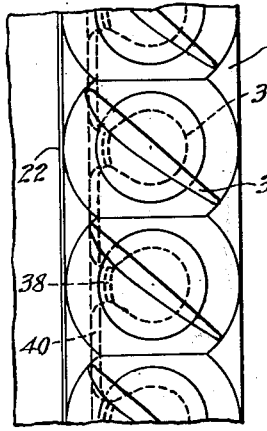
INVENTOR.
George A. Dean
BY
Godfrey B. Speir
ATTORNEY

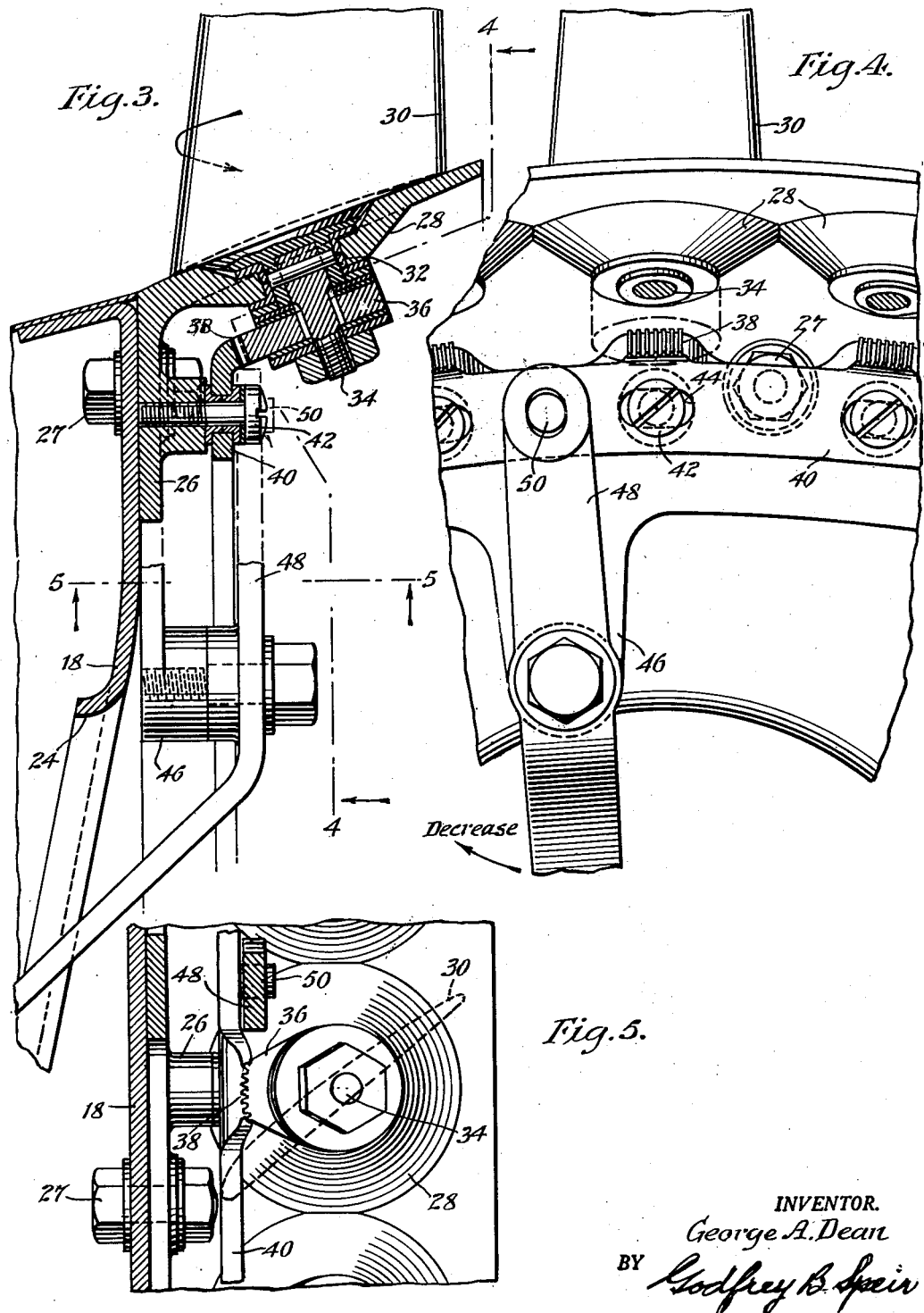

Aug. 19, 1952 G. A. DEAN 2,607,430
FAN FOR AIRCRAFT PROPELLER SPINNERS
Filed Feb. 26, 1946 4 Sheets-Sheet 3

INVENTOR.
George A. Dean
BY
Godfrey B. Speir
ATTORNEY

Aug. 19, 1952     G. A. DEAN     2,607,430
FAN FOR AIRCRAFT PROPELLER SPINNERS
Filed Feb. 26, 1946     4 Sheets-Sheet 4
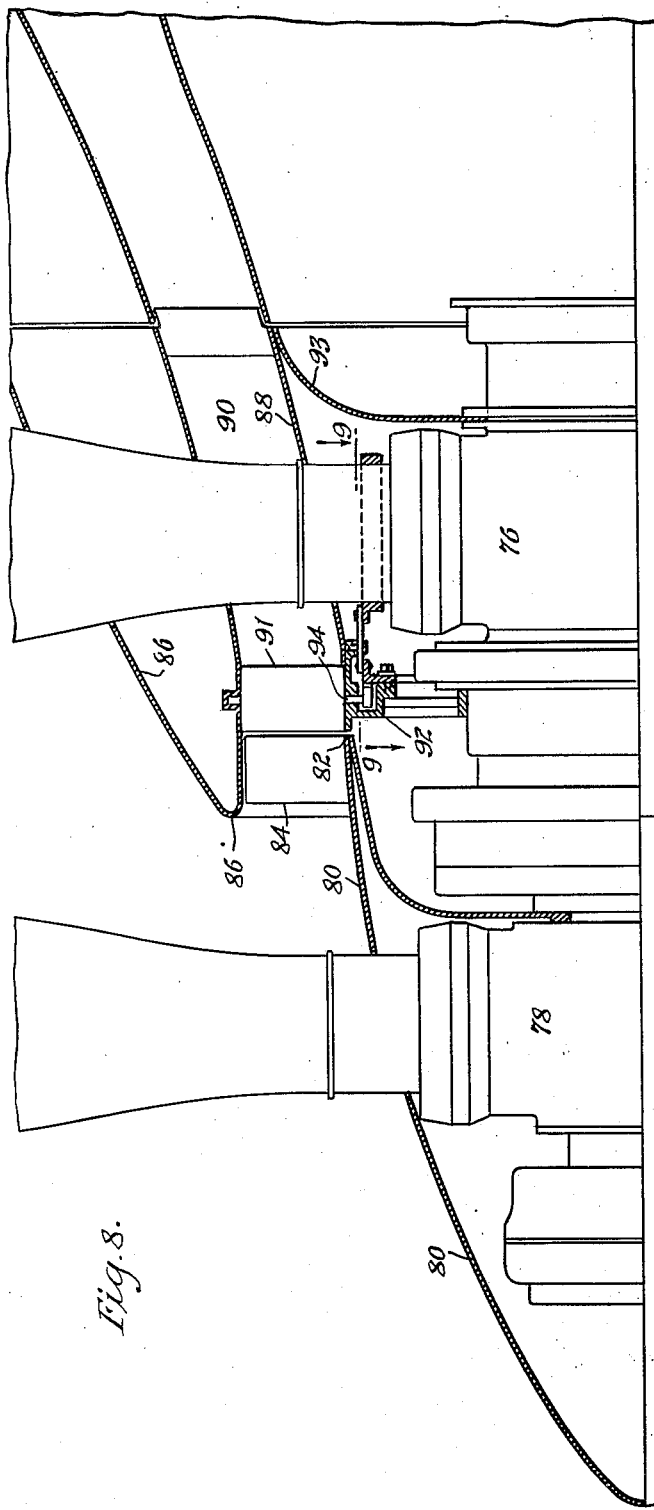
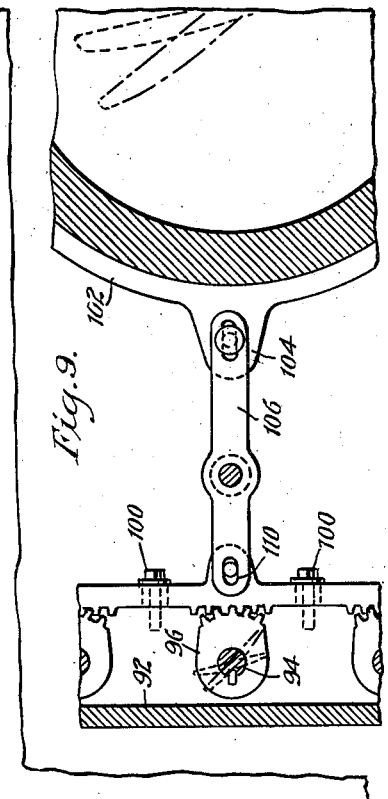
INVENTOR.
George A. Dean
BY
Godfrey B. Spein
ATTORNEY Patented Aug. 19, 1952

2,607,430

UNITED STATES PATENT OFFICE 2,607,430

FAN FOR AIRCRAFT PROPELLER SPINNERS

George A. Dean, Radburn, N. J., assignor to Curtiss-Wright Corporation, a corporation of Delaware Application February 26, 1946, Serial No. 650,207

3 Claims. (Cl. 170—135.743)

This invention relates to aircraft and is concerned particularly with improvements in fans used in conjunction with aircraft propellers.

The art reveals fans for aircraft power plants, used in conjunction with propellers, and adapted to augment the flow of air into a cowled portion of the aircraft, such air usually, though not necessarily, being used for the cooling of internal combustion engines. Fans which are secured to the propeller to rotate therewith have been proposed, and fans which are geared up with respect to the propeller have also been proposed. The problem involved in fan design for aircraft power plant cooling is to secure maximum air delivery under conditions of low air speed and high power operation, which entails maximum absorption of horsepower by the fan. But under conditions where flow of rammed air into the cowling, due to high air speed, is sufficient for engine cooling, it is desirable to have the fan absorb minimum horsepower and to give minimum boost to the cooling air.

In the present invention, fan arrangements are provided wherein the fan blades are variable in pitch so that the effect of the fan may be changed in accordance with airplane speed or fan speed conditions. Preferably, though not necessarily, the pitch of the fan blades may be coordinated with changes in pitch of the usual controllable pitch propeller driven by an aircraft engine. I provide a mechanism which permits the fan blades to be changed in pitch coincidentally with the changes in pitch of the propeller blades, along with mechanism which will proportion the pitch changes of the fan blades to the pitch changes of the propeller to secure optimum fan output characteristics under all normal aircraft operating conditions.

I further provide an improved fan arrangement, having the characteristics mentioned above, useable in conjunction with a dual rotation propeller system having one of the propellers of the system cowled to define an annular air entrance opening for the engine or other apparatus requiring cooling air or requiring ambient air within the aircraft.

Objects of the invention are: to provide an auxiliary fan for an aircraft power plant whose blades are changeable in pitch; to provide an auxiliary fan in an aircraft power plant installation whose blades are changeable in pitch coincidentally with changes in pitch of a controllable pitch propeller associated with the fan; to provide a proportioning mechanism in a controllable pitch fan assembly whereby the variation in pitch change in the fan blades may be proportioned to the changes in pitch of an associated controllable pitch propeller; to provide an auxiliary fan in an aircraft whose blades are changeable in pitch in proportion to the rotational speed of the fan; to provide a fan assembly in an aircraft installation comprising fixed pitch fan blades and controllable pitch fan blades, the fan combination being adjustable as to work done by the fan on the working fluid.

Figure 6:
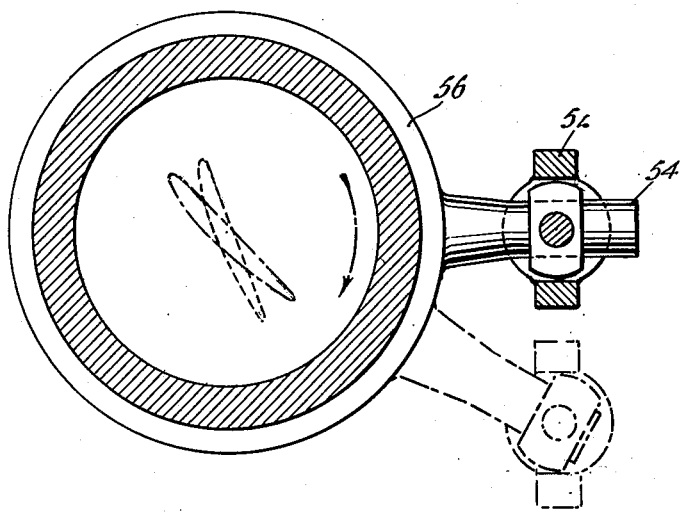

While the fan arrangements herein contemplated are susceptible to considerable variation in detail, workable arrangements of the invention are shown in the attached drawings in which: Fig. 1 is a longitudinal section through a fan and cowling system; Fig. 2 is a section on the line 2—2 through Fig. 1; Fig. 3 is an enlarged sectional view of a portion of Fig. 1, showing a construction of fan blade pitch adjusting mechanism; Fig. 4 is a section on the line 4—4 of Fig. 3; Fig. 5 is a section on the line 5—5 of Fig. 3; Fig. 6 is an enlarged fragmentary section on the line 6—6 of Fig. 1; Fig. 7 is a view similar in part to the view of Fig. 4 showing an alternative method for adjusting fan blade pitch; Fig. 8 is a longitudinal section through an alternative arrangement of the invention showing its use in connection with a dual rotation propeller system; and Fig. 9 is a fragmentary section on the line 9—9 of Fig. 8.

Referring first to Figs. 1 through 6, a controllable pitch propeller is indicated at 11, this being mounted on a propeller shaft 12 driven by an engine of any desired type. The propeller includes blades 13 and 14 mounted in the hub and adjustable in pitch by means of a motor system 15 which may be controlled by any of several methods well known in the prior art. To the propeller hub 11, a spinner 16 is secured as by a perforate disc 18 secured at its center portion to the hub 11 as at 20, and secured at its outer edge to the spinner 16 as at 22. Lightening holes 24 may be formed in the disc 18, these holes being disposed in alignment with the several propeller blades. To the outer rear edge of the spinner 16 and the disc 18, a fan hub member 26 is secured as by bolts 27. This has an exterior spherically segmental surface carrying out the general streamline of the spinner. It is embraced by a fixed cowl annulus 16a, and defines therewith a converging annular air entrance passage. A plurality of circumferentially spaced bosses 28 having openings therethrough, are provided around the member 26 to support an equal plurality of fan blades 30 which are journaled in bearings 32 so that the blades may turn for pitch adjustment. The inner ends of the blade elements 30 are provided with bolts 34 carrying gear segments 36, the several gear segments 36 of the blade plurality being meshed with gear segments 38 formed on a ring 40, supported in slidable pin-slot connections 42—44, these pin-slot connections anchoring the ring 40 to the spinner assembly for rotational adjustment relative thereto.

The pivot axis for each fan blade 30 and bolt 34 is normal to the spherical surface of the hub 26 so that, as the blades 30 which have spherically formed butts complementary to the hub 26 are rotated for pitch adjustment, the inner leading and trailing edge portions thereof will lie closely adjacent the surface of the hub 26 regardless of their pitch position. Since hub surface 26 and the butts of the blades 30 are spherical and complementary, very close clearance can be provided and this close clearance continues in all pitch adjustment positions of the blades, minimizing loss in fan efficiency. The converging air duct around the fan hub also contributes to fan efficiency by minimizing drop in velocity of air passing through the fan, which serves primarily to boost air pressure.

Secured to the spinner and fan hub assembly is a bracket 46 carrying a pivoted lever 48 whose outer end engages a pin 50 secured to the ring 40. The inner end 52 of the arm 48, as shown in Figs. 1 and 6, passes through a lightening hole 24 in the disc 18 and engages an arm 54 secured to the shank of one of the propeller blades, such as 13, by a band 56. Several arms such as 48, with their attendant end connections with the fan blade adjusting ring 40 and with the other propeller blades, may be disposed around the spinner assembly so that each of the propeller blades will contribute its share to the adjustment of the fan blades in pitch.

As the propeller blades 13 and 14 change in pitch, for instance, in a clockwise (pitch decreasing) direction as shown in Fig. 6, the arms 48 will be moved clockwise as shown in Fig. 4 thereby rotating the ring 40 in a clockwise direction with respect to the spinner assembly. The gear segments 38 will thereby move with the ring 40 and impart rotation to the gears 36, thus decreasing the pitch of the fan blades 30. Conversely, with pitch increasing movement of the propeller blades, fan blade pitch will be increased.

By the proportions of the gear segments 36 and 38, and by the proportions of the lever 48 inboard and outboard of the lever pivot 46, the angular movement of the fan blades in pitch are controlled with respect to the angular movement of the propeller blades. Depending upon the aircraft and power plant design contemplated, it may be desirable to have the fan blades move through an angle equal to the angle of propeller blade pitch change; alternately it might be desirable to have the fan blades move through greater or lesser angles than the angles through which the propeller blades move. The control of the relative angular movement of the fan blades with respect to the propeller blades may be predetermined in accordance with the gear and lever relationships.

Referring now to Fig. 7, I show an alternate arrangement wherein the fan blades may be changed in pitch in response to the speed of the spinner and fan hub. Components similar to those previously described are designated by primed numbers. The fan hub 26' carries an arm 60 to which is pivoted a bellcrank 62 as at 64, the upper limb of the bellcrank engaging the ring 40' through a pin-slot connection as at 64. The inner tangential limb 66 of the bellcrank 62 carries a mass 68 at its outer end. During rotation the mass 68 tends to be thrown outwardly which, if permitted, shifts the ring 40' in a clockwise direction and moves the fan blades in the pitch decreasing direction. This movement is resisted by a spring 70 secured at one end to the bellcrank 62 inboard of its pivot 64 and secured at its other end to an arm 72 integral with the fan hub 26'. The fan blades are thus held in the high pitch position at low rotational speeds of the spinner system; as the spinner system increases in speed, the mass 68 is flung outwardly by centrifugal force and the blades of the fan are moved toward the decreased pitch position. At low propeller rotational speeds, normal under high speed cruise conditions of the airplane, the fan blades will be in high pitch. This pitch may be set at a value where the fan blades have low incidence with respect to the relative airflow and will do little or no work upon air passing through the cowling. This condition is satisfactory for cooling air since the high air speed condition will provide sufficient natural ram of cooling air into the cowling so that no extra pumping effect is required of the fan. However, if high propeller speeds are used during low flight speed, as during take-off and climb of the airplane, the fan blades will adjust to a pitch where they will have a substantial pumping effect upon the low-speed air entering the cowling. Though the actual pitch will be less than that at high air speed, the angle of incidence of the blades with respect to the relative airflow will be relatively high, and will do considerable work on the air passing through the cowling. Pitch adjustments can be made in the design to secure best fan efficiency for all operating conditions.

Reference may now be made to Figs. 8 and 9 showing an alternate arrangement of the invention incorporating a dual rotation propeller system, the inboard propeller being indicated at 76 and outboard propeller at 78. These propellers are coaxial and rotate in opposite directions. Blade pitch adjustments are made coincidentally in both propellers by suitable mechanism well known in the art. The forward propeller 78 carries a spinner 80 terminating at its trailing edge 82 whereat it carries a plurality of fixed pitch fan blades 84. The rear propeller 76 carries a composite spinner in the form of a rotating cowl, the cowl comprising an outer rotating member 86 and an inner rotating member 88 spaced therefrom to define an annular air passage 90. The entrance to the air passage 90 is defined between the leading edge of the outer rotating cowl 86 and the surface of the forward propeller spinner 80. Within the passage 90, toward the forward end thereof, are disposed a plurality of adjustable pitch fan blades 91 journaled at their outer ends in the cowling 86 and at their inner ends in the cowling 88. The inner cowling 88 is secured to the rear propeller hub 76 by a dished member 93 and is secured at its forward end to the propeller hub by an annular member 92 which incorporates pivots 94 for the adjustable fan blades 91. Each pivot 94 for each fan blade 91 carries a gear segment 96 meshed with an annular rack 98 mounted for a limited angular movement concentrically with the cowl through pin-slot connections 100. Thus angular movement of the member 98 with respect to the propeller hub will produce pitch changing movement of the fan blades 91.

As in the prior embodiment described, the fan blades 91 in this arrangement may be designed so that their pitch adjustment depends upon the pitch adjustment of the main propeller blades. In this arrangement, as shown in Fig. 9, each propeller blade shank is provided with a ring 102 having a slotted arm 104 engaged by the rear end of a lever 106. The lever, between its ends, is journaled on a pivot 108 secured to the annular cowl support 92, and the forward end of the lever has a pin-slot connection 110 with the annular rack 98. When the propeller blade moves for pitch reduction, the rack 98 is shifted counterclockwise (or downwardly in Fig. 10), acting upon the gear segments 96 to move the fan blades in a pitch decreasing direction.

The general mode of operation of the system of Figs. 8 and 9 when used for engine cooling is similar to that previously described—at high air speeds, when propeller pitch is high, the fan blades will be so adjusted in pitch as to give little boost to airflow through the passage 90. At low air speeds and high R. P. M., both the propeller and fan blades will be at a moderate pitch setting but the fan blades will have a substantial pumping effect upon air passing into the cowling annulus 90 and will boost or augment the pumping effect already afforded by the fixed pitch fan blades 84 on the forward propeller of the dual rotation propeller system.

While Figs. 8 and 9 show the forward fan blades as fixed and the rear fan blades as variable in pitch, the blades of both fans may be variable or the forward blades might be variable and the rear blades fixed. If the forward blades are made variable, the structure such as is shown in Fig. 1 may be used. Also, the fans in Fig. 8 may utilize spherically segmental hubs, complementary fan blade butts, and normal blade pivots, as in Fig. 1 along with a converging air passage. In the construction of Fig. 1, it will be noted that the sloped spherical segment form of the fan hub 26, in conjunction with the enveloping fixed cowl 16a, provides an annular converging air passage whose area decreases progressively from the front of the fan blades toward their trailing edges. This arrangement prevents loss of velocity of the relative air as it passes through the fan. The tilted axes of the fan blades 30 permit use of the tapered air passage, and minimization of fan pumping losses is secured by the sloped, spherical form of the fan hub outer surface having small clearance relation with the complementary form of the butt ends of the fan blades.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft power plant comprising a propeller having a spinner, a fan hub adjacent the rear margin of the spinner and forming a substantial prolongation of the streamlined spinner contour, said fan hub surface comprising substantially a spherical segment, and fan blades mounted on said hub for pitch changing rotation, the blade rotational axes on said hub being normal to the surface of the hub.

2. In an aircraft power plant comprising a propeller and an embracing tapered spinner, a fan hub at the rear of said spinner having a spherically segmental exterior surface whose general profile is a substantial continuation of the spinner taper, said hub having fan blade mounting bosses therearound whose axes lie on radii of the sphere form, and fan blades mounted in said bosses for pitch change, said blades having leading and trailing edge butt surfaces complementary to the spherical hub surface and lying closely adjacent thereto.

3. In an aircraft power plant comprising a propeller including changeable pitch blades and having a spinner, an annular fan hub adjacent an end of said spinner, the hub surface forming a substantial streamlined prolongation of the spinner surface, a plurality of fan blades mounted on and extending outwardly from said hub for rotation for pitch change, the pitch change axes of the fan blades being normal to the spinner surface, and means for changing the pitch of said fan blades in unison.

GEORGE A. DEAN.

REFERENCES CITED

The following references are of record in the file of this patent:

UNITED STATES PATENTS

| Number | Name | Date |
|---|---|---|
| 1,036,122 | Kellogg | Aug. 20, 1912 |
| 1,611,658 | Magni | Dec. 21, 1926 |
| 1,648,837 | Anderson | Nov. 8, 1927 |
| 1,691,593 | Tank et al. | Nov. 13, 1928 |
| 1,761,690 | Steinmetz | June 3, 1930 |
| 1,837,568 | Moody | Dec. 22, 1931 |
| 1,907,454 | Squires | May 9, 1933 |
| 1,908,820 | Chilton | May 16, 1933 |
| 1,927,921 | Courtney | Sept. 26, 1933 |
| 1,990,979 | Chilton | Feb. 12, 1935 |
| 2,043,136 | Weible | June 2, 1936 |
| 2,054,947 | Riddle | Sept. 22, 1936 |
| 2,173,896 | Caldwell | Sept. 26, 1939 |
| 2,206,417 | Mercier | July 2, 1940 |
| 2,274,743 | Rosskopf | Mar. 3, 1942 |
| 2,306,096 | Vose | Dec. 22, 1942 |
| 2,347,153 | Hagen et al. | Apr. 18, 1944 |
| 2,407,223 | Caldwell | Sept. 10, 1946 |
| 2,426,635 | Mercier | Sept. 2, 1947 |

FOREIGN PATENTS

| Number | Country | Date |
|---|---|---|
| 815,881 | France | Dec. 17, 1937 |
| 235,569 | Germany | Dec. 19, 1909 |